United States Patent [19]
Drebin et al.

[11] Patent Number: 5,877,771
[45] Date of Patent: Mar. 2, 1999

[54] METHOD AND APPARATUS FOR SUPERSAMPLING BASED ON THE LOCAL RATE OF CHANGE IN TEXTURE

[75] Inventors: Robert A. Drebin, Mountain View; Michael Timothy Jones, San Jose, both of Calif.

[73] Assignee: Silicon Graphics, Inc., Mountain View, Calif.

[21] Appl. No.: 678,875

[22] Filed: Jul. 12, 1996

[51] Int. Cl.$^6$ ........................................ G06T 15/00
[52] U.S. Cl. ............................................. 345/430
[58] Field of Search ................... 395/119–125, 130–139; 345/419–425, 430–439

[56] References Cited

U.S. PATENT DOCUMENTS

| | | | |
|---|---|---|---|
| 4,727,365 | 2/1988 | Bunker et al. | 345/139 |
| 5,548,709 | 8/1996 | Hannah et al. | 395/510 |

OTHER PUBLICATIONS

Knittel et al., Hardware for Superior Texture Performance, *Computers & Graphics*, vol. 20, No. 4, Jul./Aug. 1996, pp. 475–481.

Knittel et al., Eliminating the Z–Buffer Bottleneck, *Proceedings of the European Design and Test Conference*, Paris, France, Mar. 1995, pp. 12–16.

Knittel et al., "Hardware for Superior Texture Performance," *Eurographics '95 Proceedings; 10th Eurographics Workshop on Graphics Hardware*, Aug. 28–29, 1995, Maastricht—The Netherlands, pp. 33–40.

Dungan et al., "Texturing Tile Considerations for Raster Graphics," *Siggraph '78 Proceedings* (1978), pp. 130–134.

Williams, L., "Pyramidal Parametrics," *Siggraph '83 Proceedings* (1983), 99. 1–11.

Watt, A. "Anti–aliasing Techniques" *Fundamentals of Three–Dimensional Computer Graphics*, pp. 267–281, 1989.

Wolberg, G., "Digital Image Warping," *I.E.E.E. Computer Society Press*, Los Alamitos, CA, Chpt. 6, pp. 163–187, 1990.

Foley et al., *Computer Graphics Principles and Practice*, Second Edition in C, Addison–Wesley Publishing Company, Massachusetts (1996), pp. 741–744 and 826–828.

Gangnet, M. et al., "Perspective Mapping of Planar Textures" *Eurographics '82 Proceedings*, 57–71 (1982).

Perny, D. et al., "Perspective Mapping of Planar Textures" *Computer Graphics*, vol. 16, No. 1, pp. 70–100, May, 1982.

Schilling, A. et al., "Texram: A Smart Memory for Texturing" *I.E.E.E. Computer Graphics & Applications*, pp. 32–41, May, 1996.

Blinn, J. and Newell, M. "Texture and Reflection in Computer Generated Images" *Communications of the ACM*, vol. 19, No. 10, pp. 542–547, Oct., 1976.

Blinn, J. "The Truth About Texture Mapping" *I.E.E.E. Computer Graphics & Applications*, Mar., 1990, pp. 78–83.

Crow, F. "A Comparison of Antialiasing Techniques" *I.E.E.E. Computer Graphics & Applications*, vol. 1, No. 1, Jan., 1981, pp. 40–48.

*Primary Examiner*—Almis R. Jankus
*Attorney, Agent, or Firm*—Sterne, Kessler, Goldstein & Fox, P.L.L.C.

[57] ABSTRACT

A method and an apparatus for high quality texture mapping. Multi-resolutional texture data for a destination pixel is supersampled at horizontal and vertical screen space sampling rates based on the local rate of change at a texture coordinate. Two-dimensional and/or three-dimensional multi-resolutional texture data is sampled. The calculated local rates of change in texture can be scaled, independently, to allow the effect of each texture dimension upon the horizontal and vertical screen space sampling rates to be controlled separately. Three examples for calculating screen space sampling rates according to the present invention are provided based on a maximum texture gradient, an optimized maximum texture gradient, or a minimum sampling routine which ensures sampling when footprint area collapses to a line. Unnecessary calculations and delays encountered in supersampling an entire display image uniformly are avoided. An excellent filter is obtained for live video texture mapping in real-time.

23 Claims, 9 Drawing Sheets

FIG. 1A

AREA SAMPLING

FIG. 1B

SUPERSAMPLING

METHOD AND APPARATUS FOR SUPERSAMPLING BASED ON THE LOCAL RATE OF CHANGE IN TEXTURE

CROSS-REFERENCE TO OTHER RELATED APPLICATIONS

The following application of common assignee contains some common disclosure U.S. patent application entitled "A Method and Apparatus for Providing Texture Using a Selected Portion of a Texture MIP-Map", by Migdal et al., Ser. No. 08/554,047, Attorney Docket No. 15-4-242.00 (1452.1300000), filed Nov. 6, 1995, now U.S. Pat. No. 5,760,783 and is incorporated herein by reference in its entirety.

BACKGROUND OF THE INVENTION

1. Field of the Invention

The present invention pertains to the field of computer graphics. More particularly, the present invention involves a method and apparatus for supersampling texture in a raster subsystem.

2. Related Art

Computer systems are commonly used for displaying graphical images on a display screen. A typical computer generated image is drawn from a plurality of constituent geometric primitives, i.e. polygons, points, lines and three-dimensional objects. To render a display image, each primitive must be transformed from object space to display screen space. Each input primitive may contribute to one or more pixels of the final image (a pixel is a picture element of a display means in display screen space).

Texture is added to provide richer surface detail to a display object. In texture mapping, texel data from a two-dimensional (2-D) or three-dimensional (3-D) texture map (or pattern image) is combined with an area or surface of an object to produce a modified object with the added texture detail. See, e.g., Foley et al., *Computer Graphics Principles and Practice,* Second Edition, Addison-Wesley Publishing Company, Reading, Mass. (1990), pp. 742–743 and 826–828 (incorporated herein by reference).

"Exact" texture mapping algorithms are known which can display a very high quality textured image. These algorithms obtain a substantially exact texture mapping by examining the contribution of every texel under a pixel footprint to an overall texel value to be mapped to the pixel footprint. In this way, texture is mapped over an entire pixel footprint for any arbitrary pixel footprint shape and orientation. See, e.g., the Feibush, Levoy, and Cook algorithm and the Blinn and Newell algorithm as summarized by Foley at pp. 742–743 and Wolberg, G., *Digital Image Warping,* (I.E.E.E. Computer Society Press: Los Alamitos, Calif. 1990), Chapter 6, page 178 (incorporated herein by reference).

For performance and cost reasons, however, exact mapping algorithms are often unworkable. A texture is often represented by a million or more texels. A single display scene can map from tens or hundreds of different textures. Complex video images and special effects further increase the work required for an exact texture-mapping, as the number of texels which must be processed and filtered for a single pixel footprint is driven higher. Thus, the number of calculations required in an exact mapping algorithm is simply too great to practically provide high-quality texture detail in real-time. The performance limitations of exact texture-mapping are especially acute in the display of complex images, such as video, or in special effects applications where display objects are warped, distorted, or displayed in perspective.

Approximations have been made to the pixel footprint's shape and/or orientation to map texture more economically. The loss of texture quality due to these approximations, however, is pronounced when the shape and/or orientation of the pixel footprint differs from a corresponding texel to which it is approximately mapped. Aliasing artifacts deteriorate image quality when texels are undersampled and do not adequately cover a pixel footprint area. Conversely, excessive blurriness results when too many texels are mapped to a pixel footprint due to oversampling. See, e.g., the discussion of anti-aliasing in Wolberg, Chapter 6, pages 163–186, incorporated herein by reference.

Figure 1A:
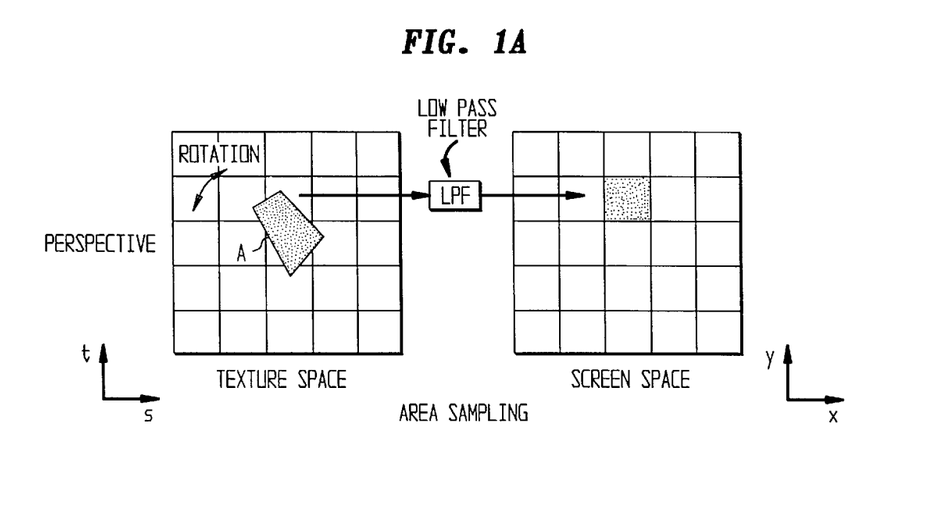
FIG. 1A shows the area of a pixel footprint mapped from screen space to texture space.

As shown in FIG. 1A, two specific orientations of a pixel footprint A relative to a texture grid, that is, rotated and in-perspective, illustrate the sampling problems encountered in texture mapping (see Wolberg at page 167). As the pixel footprint A rotates with respect to a texture grid, the sampling inaccuracy varies between undersampling and oversampling texels resulting in variable image quality. In a perspective display, a square pixel footprint can map into a rectangle in texture space. For extreme perspective views, many texels sometimes map into a single pixel footprint A.

Supersampling techniques have been developed to improve the texture detail which is mapped to a pixel footprint area. In so-called regular supersampling, an image is sampled n times the display resolution to improve the texture display quality (see FIG. 1B, n=9 adapted from Wolberg at page 169). Irregular supersampling techniques take samples at non-uniform sampling locations to further reduce aliasing artifacts which can arise when texture samples are regularly-spaced. See, e.g, the discussion of irregular sampling techniques such as stochastic sampling including Poisson sampling, jittered sampling, and point-diffusion sampling, in Wolberg, pp. 173–177. Regular and irregular supersampling techniques, however, have been inefficient and unworkable for real-time display of special effects images. Computational costs and delays quickly become prohibitive, especially when images are distorted, rotated, warped, or displayed in perspective.

Figure 1B:
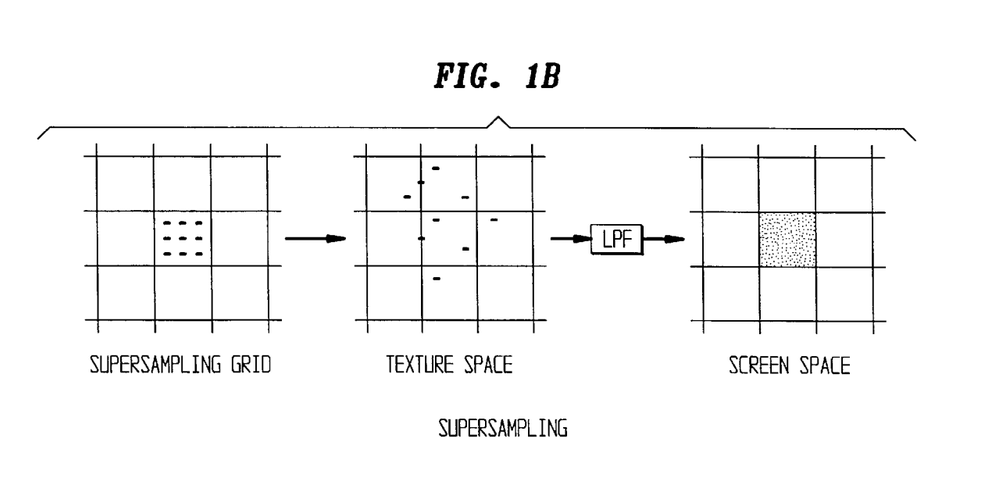
FIG. 1B shows a regular supersampling grid used in obtaining uniformly-spaced texture samples over a screen space display area mapped in texture space.

The degree of supersampling is often determined based on a global consideration of the texture detail needed in a display image. For example, a regular supersampling grid as shown in FIG. 1B is often applied over an entire display regardless of any local pixel footprint orientation and shape when mapped in texture space. This is costly and inefficient. The regular samples can also create aliasing artifacts. Proposals for adjusting supersampling density locally, however, appear to be too costly and/or slow to provide texture in real-time for video special effects. See, the discussion by Wolberg regarding adaptive stochastic sampling in section 6.3.5, page 177 (referring to work by M. Dippe) and uniform supersampling based on a single compression or area value in section 6.4.4, page 179 (referring to work by Gangnet et al.).

Perny et al. uses per-pixel supersampling of texture based on the area of the pixel footprint in texture space. Each subsample is a bilinear interpolation of the four nearest texels. A single user-defined oversampling coefficient "S" and compression ratio A are used to control a mesh size, and thereby, jointly reduce sampling rates in X and Y. See Perny et al., "Perspective Mapping of Planar Textures," *Computer Graphics,* Vol. 16, No. 1, May 1982, pp. 70–100 and Gangnet et al., "Perspective Mapping of Planar Textures," Eurographics '82 Proceedings, pp. 57–71.

An efficient supersampling texture mapping approximation has also not been applied to pre-filtered multi-resolutional texture data. For example, MIP-mapping, involves pre-filtering a texture map at progressively coarser resolutions to form a set of multi-resolution level-of-detail (LOD) maps, also called an "image pyramid" or "MIP-map." To map texture to a pixel footprint, a square texel from a particular map having the most appropriate level of detail is chosen.

In the system of Dungan et al. an image pyramid is used to reduce the integration approximation for a pixel footprint in texture space to a few lookups in a reduced resolution image (LOG image). The LOD image chosen for a pixel is based on the average of the footprint width and height. As a result, a texture may be underfiltered in one dimension and overfiltered in another dimension. The entire screen is uniformly supersampled at a 2×2 rate to minimize undersampling artifacts. See, Dungan et al., "Texture Tile Considerations for Raster Graphics," *Siggraph '78 Proceedings* (1978), pp. 130–134.

L. Williams further describes blending between two nearest LOD images to approximate footprint size. Bilinear interpolation is used to position the footprint. See, Williams, L., "Pyramidal Parametrics," *Siggraph '83 Proceedings*, (1983), pp. 1–11. This technique essentially approximates a pixel's parallelogram footprint in texture space to a prefiltered square texel. This produces an excessively blurry image due to oversampling and does not adjust for rotation. These drawbacks become especially pronounced in special effects computer graphics applications where an object is rotated, warped, or displayed in perspective.

What is needed is a texture supersampling algorithm for multi-resolutional texture data which efficiently approximates an arbitrary pixel footprint (shape and orientation) during texture mapping and displays high-quality special effects texture detail in real-time. Rich texture detail needs to be applied in real-time to video images even for warped, rotated, perspective, and/or distorted images. Two-dimensional and three-dimensional multi-resolutional texture data need to be accommodated.

SUMMARY OF THE INVENTION

The present invention pertains to an apparatus and method for high quality texture mapping. Multi-resolutional texture data for a destination pixel is supersampled at horizontal and vertical screen space sampling rates based on the local rate of change in texture. Two-dimensional and/or three-dimensional multi-resolutional texture data is sampled.

According to one aspect of the present invention, the calculated local rates of change in texture can be scaled, independently, to allow the effect of each texture dimension on a level of detail determination, and ultimately, the horizontal and vertical screen space sampling rates, to be controlled separately. Independent control over the effect of each texture dimension on subsequent screen-space sampling rates is especially advantageous when a texture pattern is presented having relatively high frequencies in different dimensions as in video images.

The present invention improves performance even further by using a prefiltered, multi-resolution representation of the texture. A prefiltered image at a selected level of detail can be chosen to reduce the horizontal and vertical sampling rates. Sampling in at least one dimension can be held to two or less samples.

Further, three examples for calculating screen space sampling rates according to the present invention are provided. The first routine determines sampling rates based on a maximum texture gradient. The second routine determines sampling rates based on an optimized maximum texture gradient. The third routine determines sampling rates based on an optimized maximum texture gradient routine which ensures minimum sampling when a footprint area collapses to a line-like state.

In the present invention, then, the number and position of texture samples are responsive to changes in texture over a pixel footprint area and to user-controlled adjustments. More samples are efficiently obtained from regions of a image where relatively fine texture varies significantly. The increased number of samples allows the greater changes in texture detail to be incorporated realistically in the final texture value. In regions of texture space where the texture remains relatively constant, fewer samples are required to accurately represent the texture over the entire pixel footprint.

By varying the sampling rates based on the local rate of change in texture, the unnecessary calculations and delays encountered in uniform supersampling of an entire display image are avoided. Independent user-control over vertical and horizontal screen space sampling rates allows further sampling optimizations. Roughly the same amount of work per display frame is required regardless of an image's perspective and/or projection. In this way, a number of samples covering a pixel footprint can be provided for a high-quality, real-time textured video display.

Thus, in the present invention an arbitrary pixel footprint (shape and/or orientation) is efficiently and accurately approximated in texture space. High-quality texture detail from 2-D or 3-D multi-resolutional texture data sets is provided in real-time even for special texture display effects where a display image is rotated, in-perspective, warped, and/or distorted.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings:

FIGS. 3A and 3B show the process of supersampling based on a local rate of change in texture according to the present invention.

FIGS. 8 to 9 are block diagrams illustrating one example of a computer graphics subsystem implementing the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Table of Contents
I. Overview and Discussion
II. Terminology
III. Example Environment
IV. Computer Graphics System
V. Supersampling Based on the Local Rate of Change in Texture
  A. Anisotropic Texture LOD Compensation
  B. Determining Screen Space Sampling Rates
  1. Maximum Texture Gradient
  2. Optimized Maximum Texture Gradient
  3. Minimum Sampling In Event of Area Collapse
VI. Specific Texture Processor Implementation
VII. Conclusion
I. Overview and Discussion The present invention provides a method and an apparatus for high quality texture mapping. Multi-resolutional texture data for a destination sample position is efficiently supersampled at horizontal and vertical screen space sampling rates based on the local rate of change in texture. The resulting texture data samples are accumulated and averaged to obtain a texture value for the destination pixel. An excellent filter is obtained for live video texture mapping in real-time.

II. Terminology

To more clearly delineate the present invention, an effort is made throughout the specification to adhere to the following term definitions.

Figure 4:
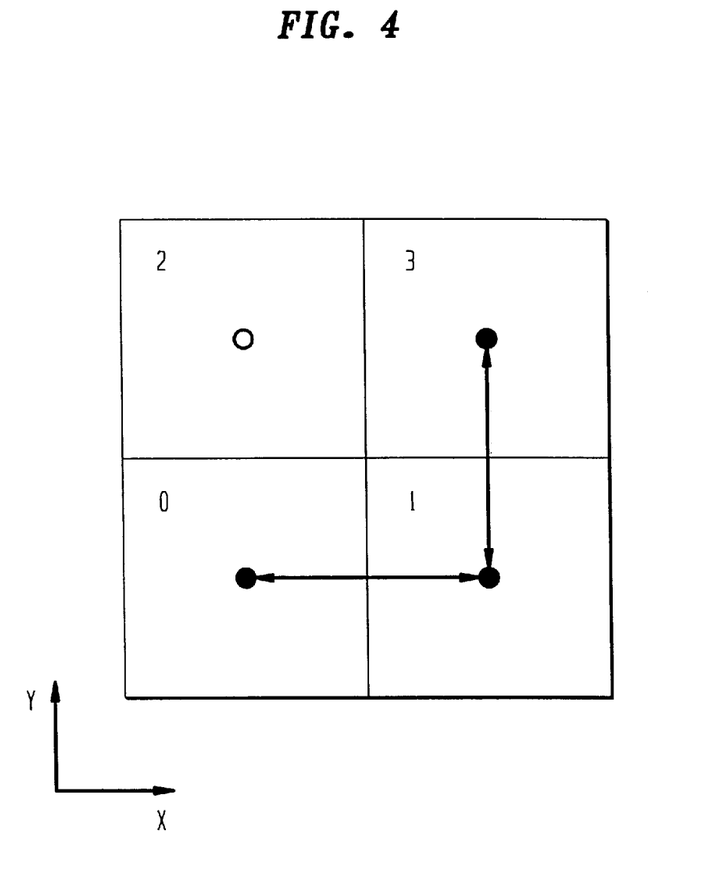
FIG. 4 shows a pixel quad for calculating a texture map coordinate.

The term "pixel" or "destination pixel" refers to a single picture element image in screen space to which texture data from a destination texture sample position is mapped. "Pixel quad" refers to a 2×2 array of pixels as shown in FIG. 4.

The terms "texture data" and "texel data" are used equivalently to refer to any digital representation of a texture pattern. Texel coordinates identify a particular texel within said texel data stored in a texture memory. According to the present invention, the "local rate of change in texture" refers, generally, to differences between texel coordinates mapping to a destination pixel or pixel quad.

A "texture sample" refers to a texel identified by texel coordinates which maps to a destination pixel.

III. Example Environment

The present invention is described in terms of a computer graphics display environment providing rich texture detail. In a preferred application of the present invention, live video texture imagery is obtained with minimal additional calculation. Rich texture detail is applied to curved, warped, or distorted video display objects in real-time. As would be apparent to one skilled in the art, however, the present invention is not limited to any particular texture motif or display object type.

IV. Computer Graphics System

Figure 2:
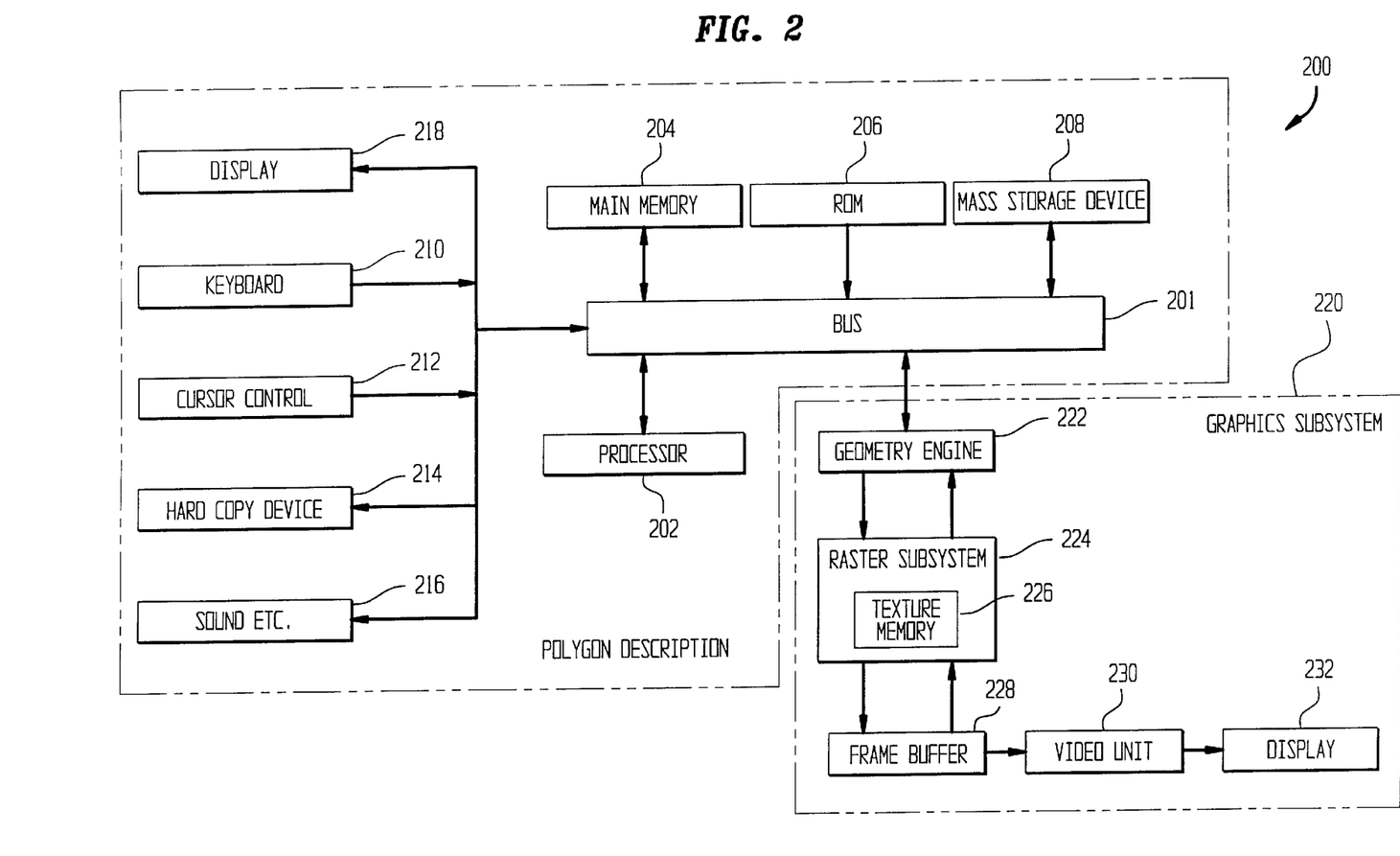
FIG. 2 shows a block diagram of an example computer graphics system implementing the present invention.

Referring to FIG. 2, a block diagram of a computer graphics display system 200 is shown. System 200 drives a graphics subsystem 220 for generating textured display images according to the present invention. In a preferred implementation, the graphics subsystem 220 is utilized as a high-end, interactive computer graphics workstation.

System 200 includes a host processor 202 coupled through a data bus 201 to a main memory 204, read only memory (ROM) 206, and mass storage device 208. Mass storage device 208 is used to store vast amounts of digital data relatively cheaply. For example, the mass storage device 208 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 202 for the benefit of an interactive user. An alphanumeric keyboard 210 and a cursor control device 212 (e.g., a mouse, trackball, joystick, etc.) are used to input commands and information. The output devices include a hard copy device 214 (e.g., a laser printer) for printing data or other information onto a tangible medium. A sound recording or video option 216 and a display screen 218 can be coupled to the system 200 to provide for multimedia capabilities.

Graphics data (i.e. a polygonal description of a display image or scene) is provided from processor 202 through data bus 201 to the graphics subsystem 220. Alternatively, as would be apparent to one skilled in the art, at least some of the functionality of generating a polygonal description could be transferred to the computer graphics subsystem as desired.

Processor 202 also passes texture data from mass storage device 208 to texture memory 226. Texture memory 226 can store two-dimensional or three-dimensional texture data sets. Multi-resolutional texture data, also referred herein generally as "image pyramids" or MIP-maps, where a texture pattern is filtered at progressively coarser resolutions is used. For example, a pre-filtered texture MIP-map representing a set of one or more levels of detail maps (LOD maps) of a texture pattern filtered at progressive resolutions varying by a power of 2 can be stored in texture memory 226.

The graphics subsystem 220 includes a geometry engine 222, a raster subsystem 224 coupled to a texture memory 226, a frame buffer 228, video board 230, and display 232. Processor 202 provides the geometry engine 222 with a polygonal description (i.e. triangles) of a display image in object space. The geometry engine 222 essentially transforms the polygonal description of the image (and the objects displayed therein) from object space (also known as world or global space) into screen space.

Raster subsystem 224 maps texture data from texture memory 226 to pixel data in the screen space polygonal description received from the geometry engine 222. Pixel data and texture data are eventually filtered, accumulated, and stored in frame buffer 228. Depth comparison and other display processing techniques can be performed in either the raster subsystem 224 or the frame buffer 228. Video unit 230 reads the combined texture and pixel data from the frame buffer 228 and outputs data for a textured image to screen display 232. Of course, as would be apparent to one skilled in the art, the output image can be displayed on display 218, in addition to or instead of display 232. The digital data representing the output textured display image can also be saved, transmitted over a network, or sent to other applications.

The present invention is described in terms of this example computer graphics system environment. Description in these terms is provided for convenience only. It is not intended that the invention be limited to application in this example environment. In fact, after reading the following description, it will become apparent to a person skilled in the relevant art how to implement the invention in alternative environments.

V. Supersampling Based on the Local Rate of Change in Texture

Figure 3A:
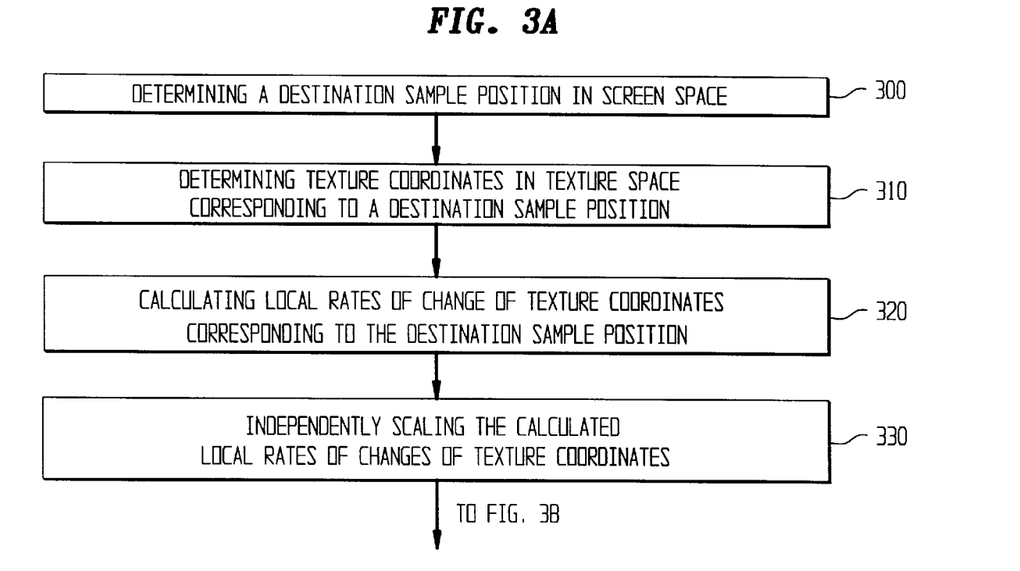
FIG. 3A shows the process for calculating and independently scaling local rates of change in texture.
Figure 3B:
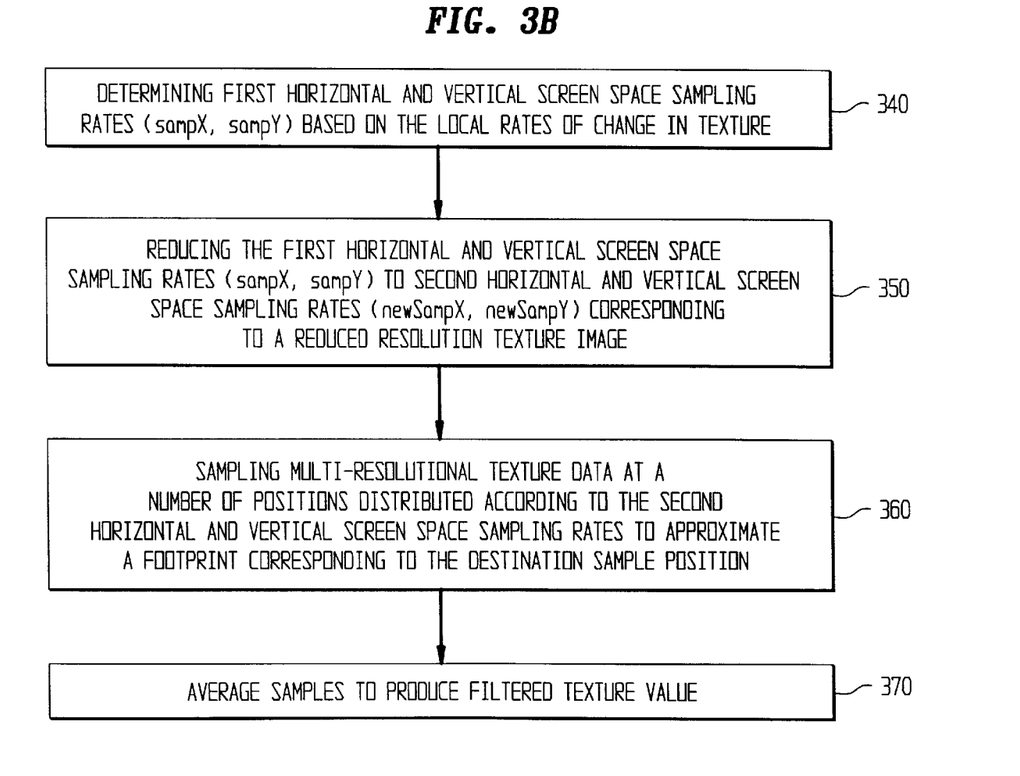
FIG. 3B further shows the process for sampling multi-resolutional texture data using sampling rates based on local rates of change in texture.

FIGS. 3A and 3B show the process of supersampling based on a local rate of change in texture according to the present invention. FIG. 3A shows the process for calculating and independently scaling local rates of change in texture. FIG. 3B further shows the process for supersampling multi-resolutional texture data using sampling rates based on local rates of change in texture. The supersampling process is implemented in computer graphics raster subsystem 224.

First, in step 300, a destination sample position in screen space is determined. In step 310, texture coordinates in texture space which map to the destination sample position are determined. These steps of determining and mapping destination sample positions to corresponding texture coordinates are generally well-known in texture mapping.

To reduce the number of computations in the present invention, however, texture processing is conducted using pixel quads. FIG. 4 shows an example 2×2 array of adjacent destination pixels forming a pixel quad. The centers of the destination pixel in screen space (x,y) are enumerated from 0 to 3. Each of these centers maps (through scan conversion) to specific locations in texture space. Texture data in texture space can be two-dimensional (s, t) or three-dimensional (s,t,u). For example, pixel 0 maps to a texel (S0,T0). S and T are capitalized to indicate that they represent specific texel coordinates in (s,t) space.

In step 320, local rates of change in texture are determined. Specifically, the local rate of change in the texture coordinates (determined in step 310) is calculated. When a pixel quad is used, the local rate of change in texture can be easily calculated for one of the four pixels by calculating differences in s and t coordinates between the centers of pixels in both x and y directions. The resultant local rate of change value is then applied to all four pixels of the pixel quad. Of course, the present invention is not limited to pixel quads, and separate calculations could be performed for each pixel.

In step 320, LODSX, LODSY, LODTX, LODTY values are computed. These values correspond to the differences between adjacent S and T texel coordinates within a pixel quad in both x and y directions, as follows:

$$LODSX = ds/dx = S0-S1; \quad (1)$$

$$LODTX = dt/dx = T0-T1; \quad (2)$$

$$LODSY = ds/dy = S1-S3; \text{ and} \quad (3)$$

$$LODTY = dt/dy = T1-T3; \quad (4)$$

where, (S0,T0), (S1,T1), and (S3,T3) are the texel coordinates for pixels 0, 1, and 3 of a pixel quad as shown in FIG. 4. It is not necessary to include separate calculations for pixel 2. Also, pixel 0 was chosen for convenience. In practice, similar differences in both x and y directions can be calculated relative to any of the other pixels 1, 2, or 3.

A. Anisotropic Texture LOD Compensation

According to one aspect of the present invention, an anisotropic texture LOD compensation step is included in determining a pixel's level-of-detail (LOD). This feature allows independent control of each texture dimension's effect on a LOD calculation. The anisotropic texture LOD compensation can be used in supersampling according to the present invention (step 330) or, more generically, in any other texture processing application.

In step 330, the rates of change of texture coordinates calculated in step 320 are independently scaled. In effect, this independent scaling step allows independent control of each texture dimension's effect upon the subsequent horizontal and vertical screen space sampling rates which are determined based on the scaled local rates of changes in texture. For example, two scalars, ScaleS and ScaleT, are used for scaling. LODSX and LODSY are multiplied by ScaleS. LODTX and LODTY are multiplied by ScaleT. Note, in a preferred example hardware advantages are realized by converting calculations to logarithmic space. In this case, scalars are added. ScaleS is added to LODSX and LODSY. Scale T is added to LODTX and LODTY.

The independent scaling factors, ScaleS, ScaleT, allow a user to underfilter when texture is known to be band-limited. For instance, video images are often oversampled in horizontal and vertical directions by different amounts. When a video image is used as a texture pattern, the present invention allows independent control over each texture dimension's effect on a LOD calculation, and ultimately, the horizontal and vertical screen space sampling rates. In particular, the ScaleS and ScaleT scaling factors can be set independently to reduce by different amounts the effect of each texture dimension s, t on subsequent horizontal and vertical screen space sampling rates. This independent scaling step compensates for the initial oversampling in the video image used for the texture pattern to optimize texture processing time and efficiency without sacrificing display quality.

In one example where the actual horizontal sampling rate $f_H$ of the video image and Nyquist frequency limit N are known for the texture video image, an efficient sampling rate can be obtained which avoids excessive oversampling using a s texture dimension scaling factor ScaleS as follows:

$$ScaleS = 2*N/f_H. \quad (5)$$

A similar calculation can be performed with respect to the t texture dimension scaling factor ScaleT where an actual vertical sampling rate of the video image and Nyquist frequency limit N are known. In general, as would be apparent to one skilled in the art given this description, other values can be used as scaling factors ScaleS and ScaleT to reduce by different amounts the effect of each texture dimension, s and t, on subsequent horizontal and vertical screen space sampling rates.

Alternatively, the scaling factors also enable overfiltering to create a blurring effect. This can be especially useful in certain multi-resolutional texture mapping applications. Of course, the scaling step 330 of the present invention is optional and can be omitted in particular applications depending upon expected texture processing time, texture quality, and other desired design goals.

In addition to scaling, the local rates of change in texture coordinates can also be clamped to within a predetermined range. After the local rates of change in texture have been calculated (step 320), and scaled (step 330) and/or clamped, the texture processing in the present invention involving more efficient supersampling proceeds to determine horizontal and vertical screen space sampling rates (step 340 in FIG. 3B).

Alternatively, as described above, the independently scaled local rates of change in texture calculated in step 320 can be applied to determine an appropriate level-of-detail. For example, after step 330, if supersampling is disabled, a conventional MIP map trilinear interpolation, as in the L. Williams article incorporated above, is performed. The current implementation when not supersampling computes the LOD by multiplying (or adding in log 2 space) ScaleS and ScaleT to the LODSX, LODSY, LODTX, and LODTY values given by equations (1) to (4). A set of scaled texture coordinate gradients (LODSX to LODTY) is then determined as follows:

$$LODSX = LODSX * ScaleS;$$

$$LODSY = LODSY * ScaleS;$$

$$LODTX = LODTX * ScaleT; \text{ and} \tag{6}$$

$$LODTY = LODTY * ScaleT.$$

A maximum texture coordinate change value DMAX is calculated as follows:

$$DMAX = MAX(MAX(ABS(LODSX), ABS(LODTX)), MAX(ABS(LODSY), ABS(LODTY))), \tag{7}$$

where MAX denotes a function selecting the maximum value and ABS denotes an absolute value function.

A level-of-detail value (LOD) is then calculated as follows:

$$LOD = \log_2 (DMAX). \tag{8}$$

This LOD is used to choose pre-filtered LOD maps nearest to the level-of-detail value and to blend and weight texels sampled from the nearest LOD maps.

B. Determining Screen Space Sampling Rates

As shown in FIG. 3B, first horizontal and vertical screen space sampling rates (sampX, sampY) are determined based on the local rates of change in texture (step 340). These local rates of changes in texture coordinates were calculated and optionally scaled and clamped as described above with respect to steps 320 and 330. Three example routines for determining first horizontal and vertical screen space sampling rates (sampX, sampY) based on the local rates of change in texture are described in further detail with respect to FIGS. 5 to 7 below.

As described above, multi-resolutional texture data is pre-filtered and stored in texture memory 226. Multiple level of detail (LOD) maps of texels form an image pyramid at progressively coarser resolutions. In general, texels are drawn from an appropriate LOD map based on the local rate of change in texture.

In step 350, the first horizontal and vertical screen space sampling rates (sampX, sampY) are reduced to second horizontal and vertical screen space sampling rates (newSampX, newSampY) corresponding to a reduced resolution texture image. In particular, when the first horizontal and vertical screen space sampling rates are each greater than or equal to 2 for a particular LOD map, it is possible to drop to LOD maps at lower level of detail. For example, when the LOD maps are progressively filtered by power of 2, it is possible to reduce the first SampX and SampY values by factors of 2. For example, if SampX=8 and SampY=64, then NewSampX=1, and NewSampY=8 which corresponds to a drop of three LOD map levels. In this way, the sampling rate corresponding to at least one screen space dimension is held to two or less samples.

In step 360, the multi-resolutional texture data is sampled at number of positions distributed according to the second horizontal and vertical screen space sampling rates (newSampX, newSampY) to approximate a footprint corresponding to the destination sample position. Texels are sampled from the appropriate resolution LOD map. In one example, the texture is sampled at uniform intervals over the destination pixel corresponding to the respective screen space sampling rates. The resulting samples are averaged with a uniform or non-uniform weighting to produce a filtered texture value for the pixel (step 370).

Any filtered interpolation can be used as the sampling method to further improve image quality. In one preferred example, a 4×4 bicubic filter is used. Weighting, averaging, interpolating and any other conventional texture processing techniques can be used to obtain the resultant texture value to be associated with a destination pixel and stored in the frame buffer 228. The sequence of steps 300–370 are repeated until an entire display image to be rendered is stored in the frame buffer 228.

1. Maximum Texture Gradient

Figure 5:
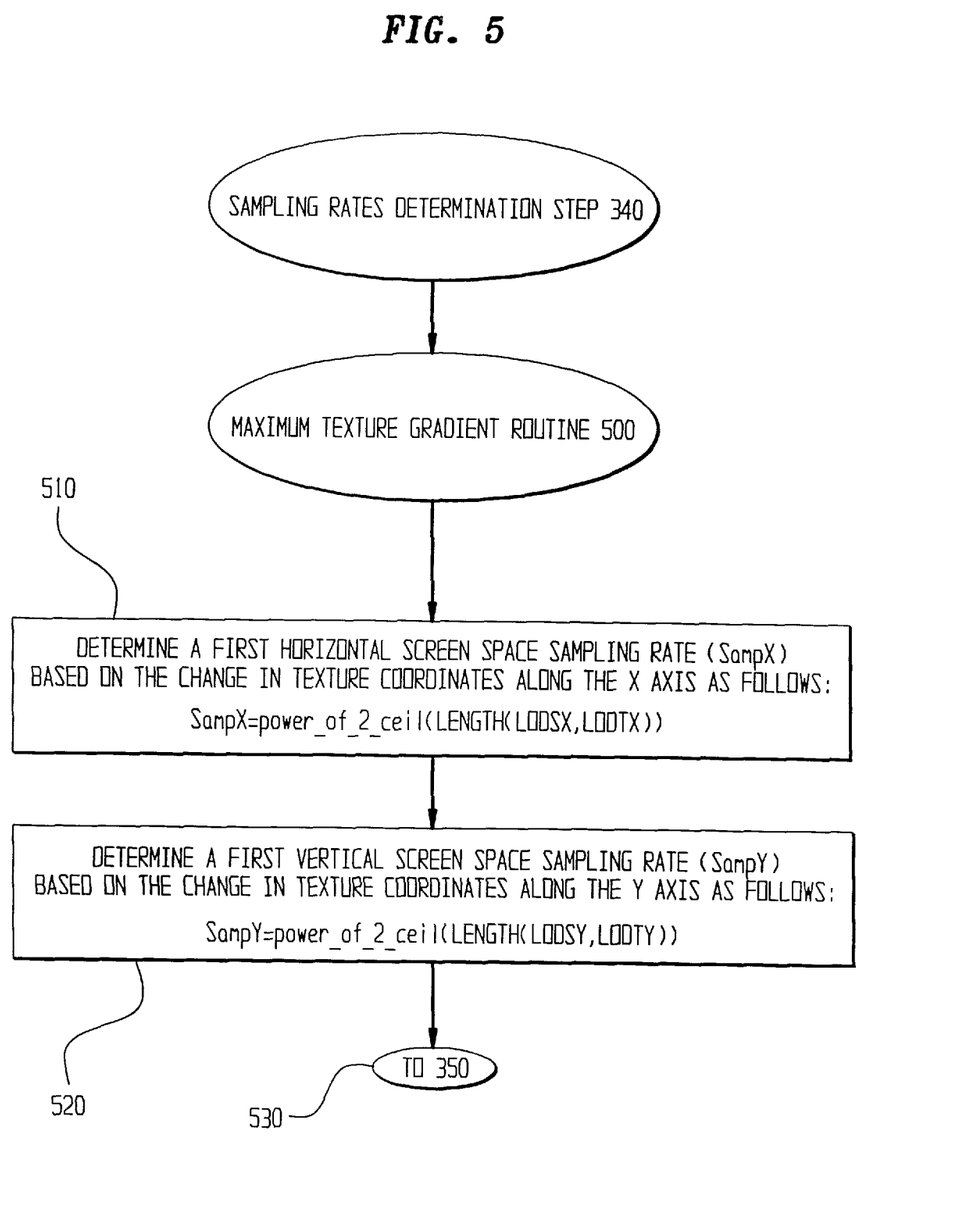
FIG. 5 shows a first example of a routine for determining sampling rates based on a maximum texture gradient routine.

FIG. 5 shows a first example for determining the horizontal and vertical screen space sampling rates (SampX, SampY) based on a maximum texture gradient routine 500. In step 510, a first horizontal screen space sampling rate SampX is determined based on the maximum texture coordinate change along the X axis as follows:

$$SampX = power\_of\_2\_ceil(LENGTH(LODSX, LODTX)); \tag{9}$$

where LENGTH is a distance function which approximates or equals $\sqrt{LODSX^2 + LODTX^2}$. Thus, LENGTH gives the total change in texture coordinates across the pixel with respect to its X axis. The ceiling function rounds the result up to the next nearest power of two. The ceiling function always returns a value greater or equal to 1.

In step 520, a first vertical screen space sampling rate SampY is determined based on the maximum Y coordinate gradient as follows:

$$SampY = power\_of\_2\_ceil(LENGTH(LODSY, LODTY)); \tag{10}$$

where LENGTH is a distance function which approximates or equals $\sqrt{LODSY^2 + LODTY^2}$. Here LENGTH gives the total change in texture coordinates across the pixel with respect to its Y axis. Again the ceiling function rounds the result up to the next power of two.

The power_of_2_ceil function is provided based on hardware considerations. Other rounding functions can be substituted. The present invention, however, is not limited to this specific function as other functions and operations can be used which would be apparent to one skilled in the art given this description.

In step 530, the routine 500 ends and returns to step 350.

2. Optimized Maximum Texture Gradient

Figure 6:
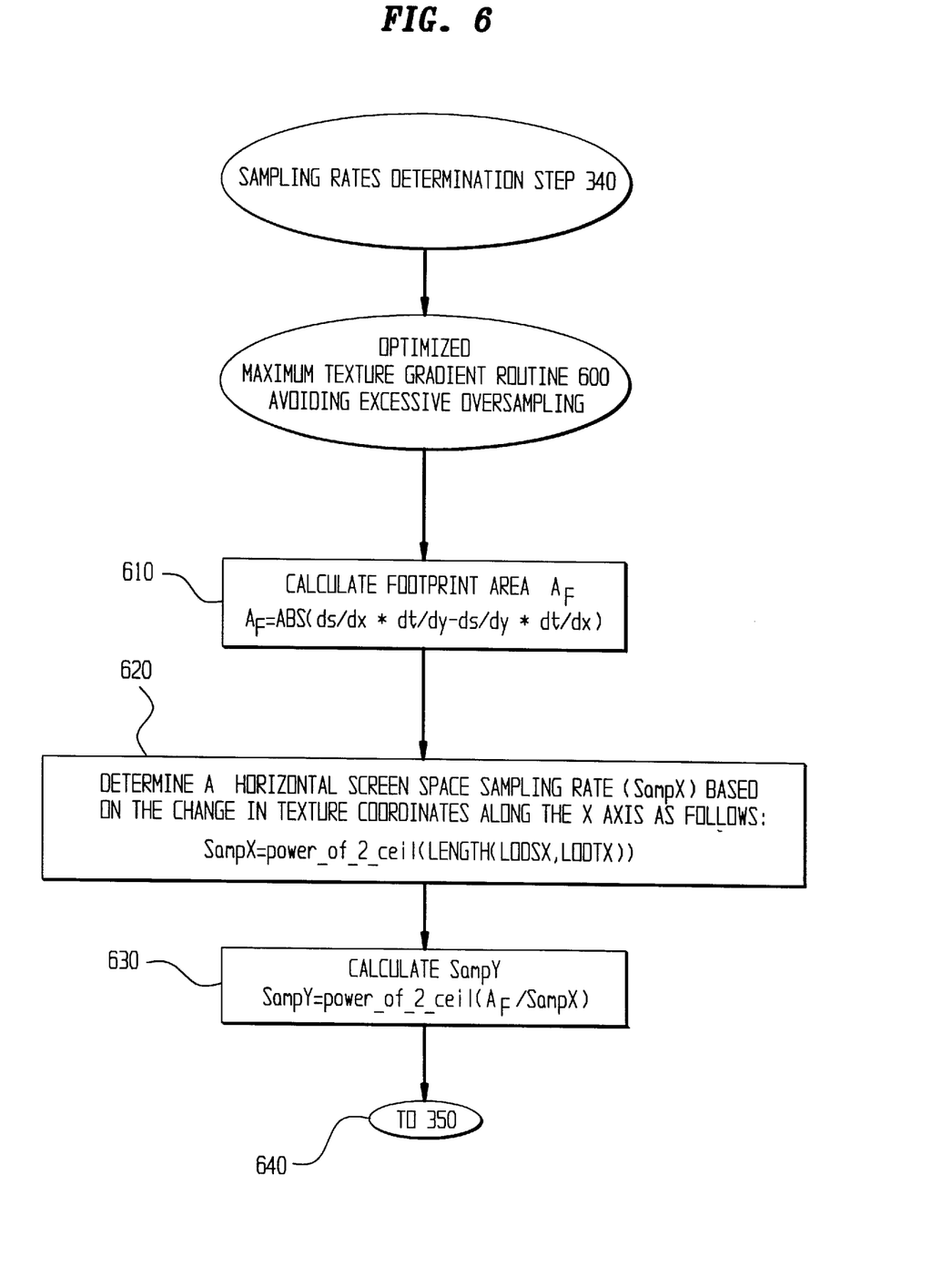
FIG. 6 shows a second example of a routine for determining sampling rates based on an optimized maximum texture gradient routine.

FIG. 6 shows a second example for determining horizontal and vertical screen space sampling rates (SampX, SampY) based on an optimized maximum texture gradient routine 600. To prevent excessive oversampling, the area of the pixel footprint in texture space is used as a rough upper bound for the total number of samples, SampX*SampY, for the pixel.

In step 610, the area of the pixel footprint, $A_F$, is approximated with the following cross-product:

$$A_F = ABS(ds/dx * dt/dy - ds/dy * dt/dx), \qquad (11)$$

where ABS denotes an absolute value function.

In Step 620, SampX is computed according to equation 9, as described above with respect to step 510. However, in step 630, SampY is calculated, as follows, to further optimize sampling by avoiding excessive oversampling:

$$SampY = \text{power\_of\_2\_ceil}(A_F/SampX); \qquad (12)$$

Again, another rounding function may be substituted for power_of_2_ceil.

In one preferred implementation, equations (11) and (12) are modified based on hardware considerations to:

$$A_F = \text{power\_of\_2\_ceil}(ABS(ds/dx * dt/dy - ds/dy * dt/dx)), \qquad (13)$$

and $$SampY = A_F/SampX. \qquad (14)$$

In step 640, the routine 600 ends and returns to step 350.

3. Minimum Sampling In Event of Area Collapse

Figure 7:
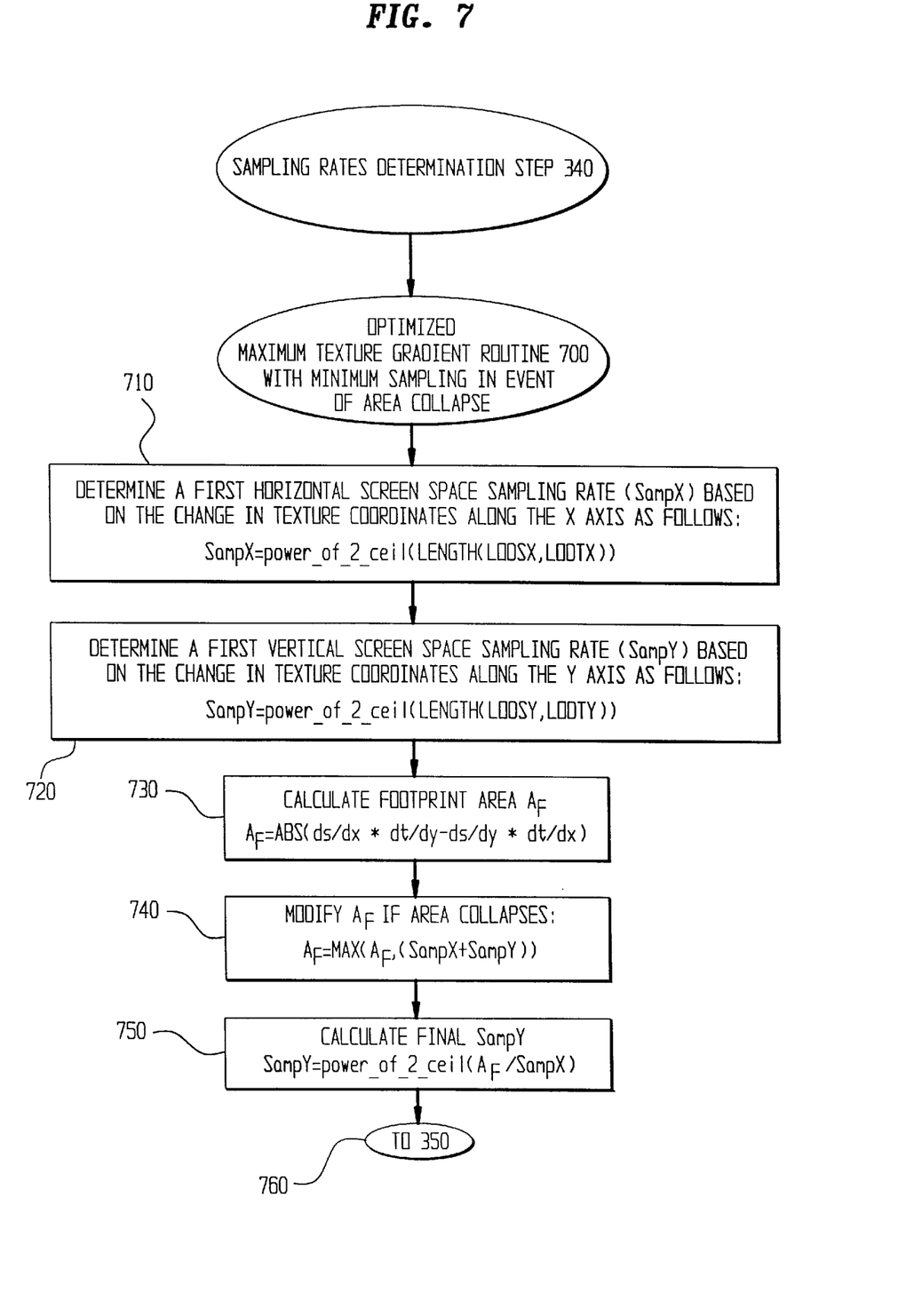
FIG. 7 shows a second example of a routine for determining sampling rates based on a maximum texture gradient routine with minimum sampling in the event of footprint area collapse.

FIG. 7 shows a third example for determining horizontal and vertical screen space sampling rates (SampX, SampY) based on an optimized maximum texture gradient routine 700. Comparisons are made to ensure sufficient sampling based on the perimeter of a pixel footprint when the footprint area collapses to a line. In steps 710 and 720, first horizontal and vertical screen space sampling rates, SampX and SampY, are determined as described above with respect to steps 510 and 520. In step 730, the pixel footprint area $A_F$ calculation is performed as in step 610.

In step 740, the pixel footprint area calculation is further modified to insure sufficient sampling when the perimeter of the footprint is large, but the area is small. $A_F$ is further modified in step 740 as follows:

$$A_F = MAX(A_F, (SampX + SampY)) \qquad (15)$$

where SampX is computed using equation (9) and SampY is computed using to equation (10). The sum SampX+SampY approximates the length of the collapsed footprint. In step 750, the final SampY is computed according to:

$$SampY = \text{power\_of\_2\_ceil}(A_F/SampX). \qquad (16)$$

In Step 760, the routine ends and returns to step 350.

VI. Specific Texture Processor Implementation

Figure 8:
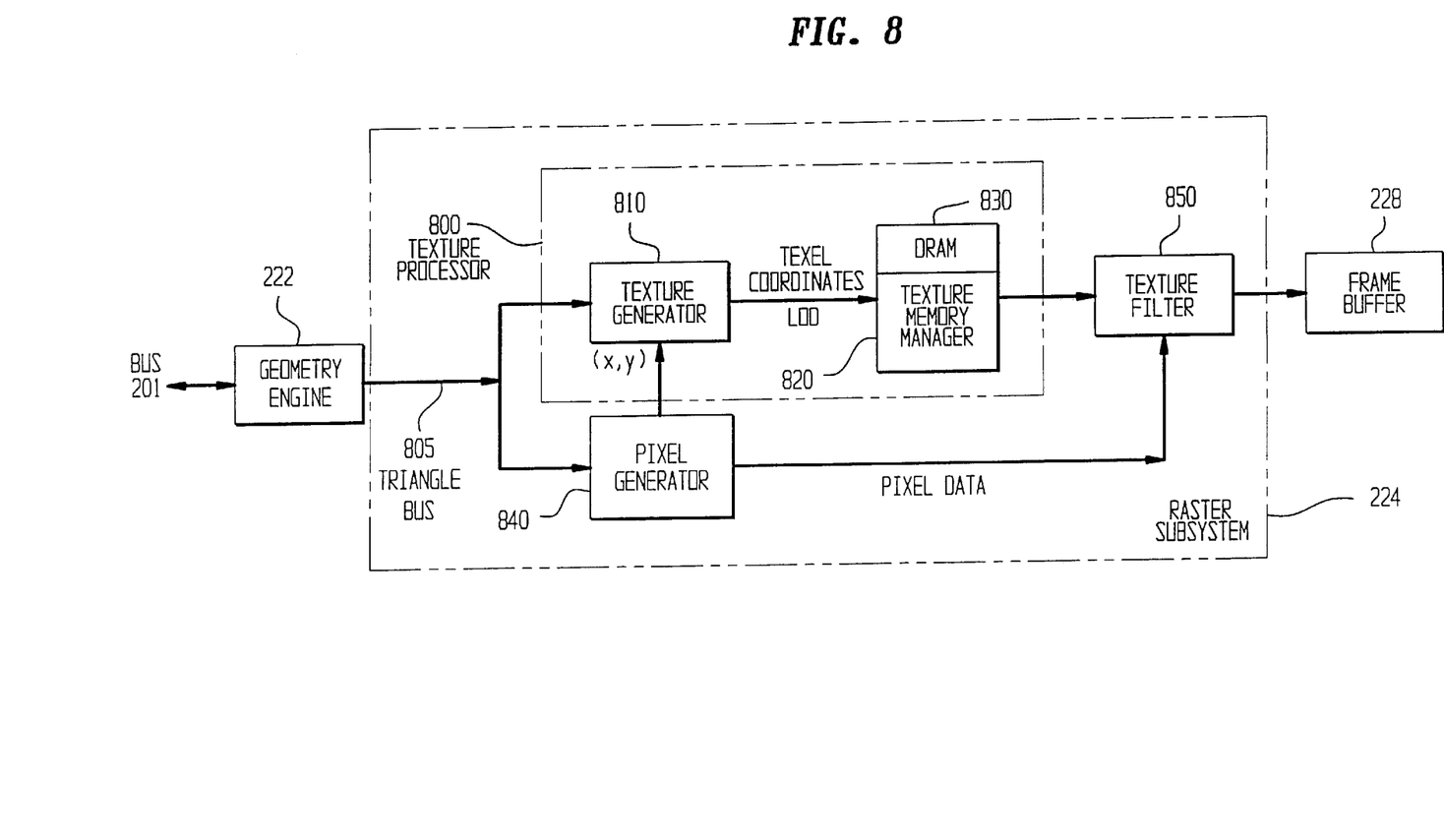
FIG. 8 shows a raster subsystem including a texture processor having a texture generator and a texture memory manager.
Figure 9:
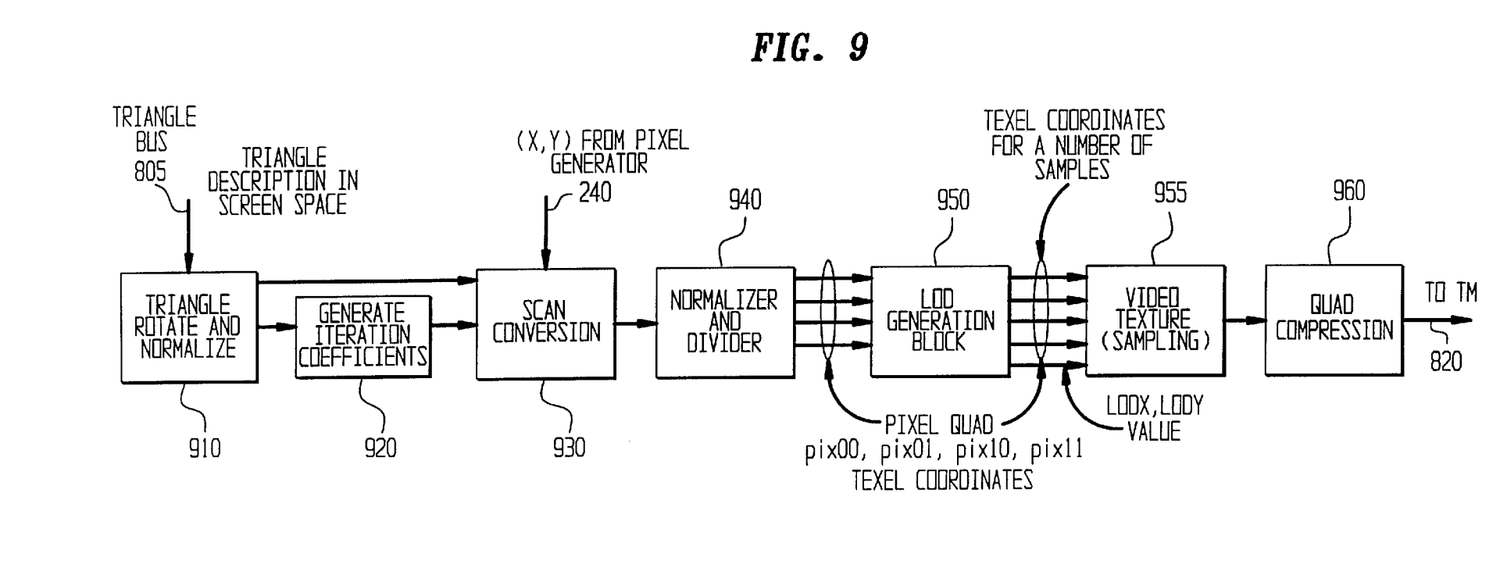
FIG. 9 shows a block diagram of the texture generator in FIG. 8 having a block for sampling texture according to the present invention.

FIGS. 8 to 9 illustrate one preferred example of implementing supersampling, according to the present invention, in a computer graphics subsystem 220. The supersampling is carried out in a texture processor 800 within raster subsystem 224. FIG. 8 shows a block diagram of a texture processor 800 within raster subsystem 224. Texture processor 800 includes a texture generator 810 and a texture memory manager 820. FIG. 9 shows a block diagram of the texture generator 810 in more detail. The operation of texture processor 800 in carrying out supersampling based on the local rate of change in texel coordinates will be made even more clear by the following description.

As shown in FIG. 8, raster subsystem 224 includes texture processor 800, pixel generator 840, and texture filter 850. The texture processor 800 includes a texture generator 810 coupled to a texture memory manager 820. Texture memory manager 820 is further coupled to texture memory (DRAM) 830.

Both the texture generator 810 and the pixel generator 840 are coupled to the geometry engine 222 via a triangle bus 805. As explained earlier with respect to FIG. 2, polygonal primitives (i.e. triangles) of an image in screen space (x,y), are output from the geometry engine 222. Texture generator 810 outputs specific texel coordinates for a pixel quad and an appropriate LOD value based on the triangle description received from geometry engine 222 and the (x,y) screen space coordinates of the pixel quad received from pixel generator 840. The LOD value identifies the level of detail map in DRAM 830. The LOD map identified by the LOD value includes a texel at the appropriate level of detail.

Texture memory manager 820 retrieves the texel stored in DRAM 830. The retrieved texel data is then sent to a texture filter 850.

Texture filter 850 performs sample interpolation and averages NewSampX*NewSampY interpolated samples. The averaged value is combined with corresponding pixel data output by the pixel generator 840 for storage in frame buffer 228.

FIG. 9 shows component modules 910–960 forming texture generator 810. Blocks 910 to 940 represent graphics processing modules for scan converting primitives. For purposes of this example, it is presumed that the primitive description consists of triangles and that pixel data is processed as 2×2 pixel quads. Module 910 rotates and normalizes the input triangles received across triangle bus 805. Module 920 generates iteration coefficients. Scan conversion module 930 then scan converts the triangles based on the outputs of modules 910 and 920 and the (x,y) coordinates output from a stepper (not shown) in pixel generator 840. Texture coordinates for each pixel quad are ultimately output from scan conversion module 930. Normalizer and divider 940 outputs normalized texture coordinates for the pixel quad. Such scan conversion processing is well-known for both two-dimensional and three-dimensional texture mapping and need not be described in further detail.

With reference to the process described in FIGS. 3 to 7, blocks 910–940 essentially perform steps 300 to 310. Block 950 performs steps 320 to 350 including any or all routines 500–700. Block 955 performs step 360. Block 850 performs step 370. When supersampling is to be performed according to the present invention, LOD generation block 950 determines two level of detail values, LODX LODY, for texel coordinates associated with a pixel quad. These LOD values correspond to supersampling rates for X and Y, e.g., sampX, sampY as described above, not to an image level. These supersampling rates can be decreased to NewSampX, NewSampY using a reduced resolution map.

According to this further feature of the present invention, a prefiltered image (i.e. an LOD mipmap) is chosen so that the sampling rate in either the X or Y dimension is never more than two samples. The sampling rate in the other dimension drops by the same rate accordingly. For example, an 8×64 sampling rate without an image pyramid becomes a 1×8 sampling rate with an image pyramid (reduced by a factor $2^3$).

Finally, sampling block 955 supersamples pixels according to the present invention as described above with respect to FIGS. 3 to 7. A number of samples based on the local rate of changes in texel coordinates are output for each pixel in the pixel quad. The texel coordinates and map level for each sample then sent to quad compression block 960.

The present invention takes advantage of the use of a pixel quad to reduce the amount of data required to be sent from the texture generator 810 to the texture memory manager 820. Quad coordinate compression module 960 compresses the samples of texture coordinates of a pixel quad and the map level data sent to one or more texture memory managers 820. In particular, in a 2×2 pixel quad, texture coordinates for one pixel are needed but the other three pixels can be defined relative to the first pixel. In this way, only the differences (i.e. the offsets) between the centers of the other three pixels relative to the center of the first pixel need to be transmitted.

Finally, texture memory manager 820 then decompresses texture coordinates of a pixel quad and map level value information received from texture generator 810. Texture coordinates for one pixel are received in fill. Texture coordinates for the other three pixels can be determined by the offsets to the first pixel texture coordinates. The map level value is associated with each pixel. Corresponding texture data is then read and returned from DRAM 830 and provided to texture filter 850.

VII. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented texture sampling method for supersampling multi-resolutional texture data to provide texture for an image to be displayed on a display screen in real-time, said multi-resolution texture data comprising a texture pattern and at least one reduced resolution texture pattern, said multi-resolution texture data being defined in each texture dimension of texture space by texture coordinates, and said image being represented by pixel data defined in screen space dimensions by screen space coordinates (x,y), said texture sampling method comprising the steps of:

(a) determining a destination sample position in screen space;

(b) determining texture coordinates in texture space corresponding to said destination sample position;

(c) calculating local rates of change of said texture coordinates corresponding to said destination sample position; further comprising, prior to step (d), the step of scaling said local rate of change of at least one texture coordinate calculated in step (c), wherein each local rate of change for each texture coordinate is scaled independently;

(d) determining first horizontal and vertical screen space sampling rates (sampX, sampY) based on said local rates of change in texture calculated in step (c) and independently scaled in said scaling step;

(e) reducing said first horizontal and vertical screen space sampling rates (sampX, sampY) to second horizontal and vertical screen space sampling rates (newSampX, newSampY) corresponding to a reduced resolution texture image when said first horizontal and vertical screen space sampling rates are each greater than or equal to 2; and (f) sampling said texture data at a number of positions distributed according to said second horizontal and vertical screen space sampling rates to approximate a footprint corresponding to said destination sample position wherein said texture space comprises horizontal and vertical texture dimensions corresponding to horizontal and vertical texture coordinates (s,t), said texture pattern being provided as a video image, and wherein said scaling step scales local rates of change along said horizontal and vertical texture coordinates by different amounts to compensate for oversampling in said video image.

2. The method of claim 1, wherein said scaling step comprises multiplying said local rate of change of at least one texture coordinate by a corresponding, predetermined scaling factor approximately equal to twice the Nyquist frequency limit for said video image divided by an actual sampling rate of said video image.

3. A computer-implemented texture sampling method for supersampling multi-resolutional texture data to provide texture for an image to be displayed on a display screen in real-time, said multi-resolution texture data comprising a texture pattern and at least one reduced resolution texture pattern, said multi-resolution texture data being defined in each texture dimension of texture space by texture coordinates, and said image being represented by pixel data defined in screen space dimensions by screen space coordinates (x,y), said texture sampling method comprising the steps of:

(a) determining a destination sample position in screen space;

(b) determining texture coordinates in texture space corresponding to said destination sample position;

(c) calculating local rates of change of said texture coordinates corresponding to said destination sample position;

(d) determining first horizontal and vertical screen space sampling rates (sampX, sampY) based on said local rates of change in texture calculated in step (c);

(e) reducing said first horizontal and vertical screen space sampling rates (sampX, sampY) to second horizontal and vertical screen space sampling rates (newSampX, newSampY) corresponding to a reduced resolution texture image when said first horizontal and vertical screen space sampling rates are each greater than or equal to 2; and (f) sampling said texture data at a number of positions distributed according to said second horizontal and vertical screen space sampling rates to approximate a footprint corresponding to said destination sample position, wherein said step (c) includes the step of:

calculating a set of texture gradients (ds/dx, ds/dy, dt/dx, dt/dy) representing local rates of change in said texture coordinates (s,t) along horizontal and vertical screen space coordinates (x,y) through the footprint.

4. The method of claim 3, wherein said step (d) comprises the steps of:

determining a first horizontal screen space sampling rate (sampX) based on the maximum change across the pixel in s and t texture coordinates along the x screen space coordinate; and determining a first vertical screen space sampling rate (sampY) based on the maximum change across the pixel in s and t texture coordinates along the y screen space coordinate.

5. The method of claim 4, wherein sampX is defined as:

sampX=power_of_2_ceil(LENGTH(LODSX, LODTX), where LODSX equals a ds/dx texture gradient, LODTX equals a dt/dx texture gradient, LENGTH represents a distance function which approximates the square root of the quantity [(LODSX)$^2$ +(LODTX)$^2$ ], and power-of-2-ceil represents a rounding function which rounds to the next nearest power of two; and sampY is defined as:

sampY=power_of_2_ceil(LENGTH(LODSY, LODTY), where LODSY equals a ds/dy texture gradient, LODTY equals a dt/dy texture gradient, LENGTH represents a distance function which approximates the square root of the quantity [(LODSY)$^2$ +(LODTY)$^2$ ], and power-of-2-ceil represents a rounding function which rounds to the next nearest power of two.

6. The method of claim 5, wherein step (d) further comprises the steps of:

calculating a footprint area $A_F$ based on a set of texture gradients ds/dx, dt/dy, ds/dy, and dt/dx where $A_F$=ABS (ds/dx*dt/dy–ds/dy*dt/dx), ABS denotes an absolute value function;

modifying $A_F$ when the pixel footprint area collapses to approximate a line, said modifying step consisting of setting $A_F$ to equal the maximum of ABS (ds/dx*dt/dy–ds/dy*dt/dx) and SampX+SampY; and calculating a final vertical screen space sampling rate (sampY) based on the ratio of $A_F$, as determined after said modifying step, and SampX.

7. The method of claim 6, wherein said final vertical screen space sampling rate, SampY is defined as:

sampY=power_of_2_ceil ($A_F$/SampX) where power_of_2_ceil represents a rounding function which rounds to the next nearest power of two.

8. The method of claim 3, wherein said step (d) comprises the steps of:

calculating a footprint area $A_F$ based on a set of texture gradients ds/dx, dt/dy, ds/dy, and dt/dx where $A_F$=ABS (ds/dx*dt/dy–ds/dy*dt/dx), ABS denotes an absolute value function;

determining a first horizontal screen space sampling rate (sampX) based on the maximum change across the pixel in s and t texture coordinates along the x screen space coordinate; and determining a first vertical screen space sampling rate (sampY) based on the ratio of $A_F$ and SampX.

9. The method of claim 8, wherein in said step (d):

sampX is defined as:

sampX=power_of_2_ceil(LENGTH(LODSX, LODTX), where LODSX equals ds/dx, LODTX equals dt/dx, LENGTH represents a distance function which approximates the square root of the quantity [(LODSX)$^2$ +(LODTX)$^2$ ], and power_of_2_ceil represents a rounding function which rounds to the next nearest power of two; and sampY is defined as:

sampY=power_of_2_ceil ($A_F$/SampX) where power_of_2_ceil represents a rounding function which rounds to the next nearest power of two.

10. The method of claim 3, wherein said texture data comprises at least one of two-dimensional texture data and three-dimensional texture data.

11. A computer graphics rasterizer system for supersampling multi-resolutional texture data to provide texture for an image to be displayed on a display screen in real-time, said multi-resolution texture data comprising a texture pattern and at least one reduced resolution texture pattern, said multi-resolution texture data being defined in each texture dimension of texture space by texture coordinates, and said image being represented by pixel data defined in screen space dimensions by screen space coordinates (x,y), said rasterizer system comprising:

destination sample position determining means for determining a destination sample position in screen space;

texture coordinate determining means for determining texture coordinates in texture space corresponding to said destination sample position;

local texture rate of change calculating means for calculating local rates of change of said texture coordinates corresponding to said destination sample position;

screen space sampling rate determining means for determining first horizontal and vertical screen space sampling rates (sampX, sampY) based on said local rates of change in texture calculated by said local texture rate of change calculating means and reducing said first horizontal and vertical screen space sampling rates (sampX, sampY) to second horizontal and vertical screen space sampling rates (newSampX, newSampY) corresponding to a reduced resolution texture image when said first horizontal and vertical screen space sampling rates are each greater than or equal to 2; and sampling means for sampling said texture data at a number of positions distributed according to said second horizontal and vertical screen space sampling rates to approximate a footprint corresponding to said destination sample position;

further comprising scaling means for scaling said local rate of change of at least one texture coordinate calculated in said local texture rate of change calculating means, wherein each local rate of change for each texture coordinate is scaled independently to allow independent control over said second horizontal and vertical screen space sampling rates;

wherein said texture space comprises horizontal and vertical texture dimensions corresponding to horizontal and vertical texture coordinates (s,t), said texture pattern being provided as a video image, and wherein said scaling means comprises means for scaling said local rates of change along each texture coordinate by different amounts to compensate for oversampling in said video image.

12. The rasterizer system of claim 11, wherein said scaling means further comprises multiplying means for multiplying said local rate of change of at least one texture coordinate by a corresponding, predetermined scaling factor approximately equal to twice the Nyquist frequency limit for said video image divided by an actual sampling rate of said video image.

13. A computer graphics rasterizer system for supersampling multi-resolutional texture data to provide texture for an image to be displayed on a display screen in real-time, said multi-resolution texture data comprising a texture pattern and at least one reduced resolution texture pattern said multi-resolution texture data being defined in each texture dimension of texture space by texture coordinates, and said image being represented by pixel data defined in screen space dimensions by screen space coordinates (x,y), said rasterizer system comprising:

destination sample position determining means for determining a destination sample position in screen space;

texture coordinate determining means for determining texture coordinates in texture space corresponding to said destination sample position;

local texture rate of change calculating means for calculating local rates of change of said texture coordinates corresponding to said destination sample position;

screen space sampling rate determining means for determining first horizontal and vertical screen space sampling rates (sampX, sampY) based on said local rates of change in texture calculated by said local texture rate of change calculating means and reducing said first horizontal and vertical screen space sampling rates (sampX, sampY) to second horizontal and vertical screen space sampling rates (newSampX, newSampY) corresponding to a reduced resolution texture image when said first horizontal and vertical screen space sampling rates are each greater than or equal to 2; and sampling means for sampling said texture data at a number of positions distributed according to said second horizontal and vertical screen space sampling rates to approximate a footprint corresponding to said destination sample position, wherein said local texture rate of change calculating means comprises texture gradient set calculating means for calculating a set of texture gradients (ds/dx, ds/dy, dt/dx, dt/dy) representing local rates of change in said texture coordinates (s,t) along horizontal and vertical screen space coordinates (x,y) through the footprint.

14. The rasterizer system of claim 13, wherein said screen space sampling rate determining means comprises:

means for determining a first horizontal screen space sampling rate (sampX) based on the maximum change across the pixel in s and t texture coordinates along the x screen space coordinate; and means for determining a first vertical screen space sampling rate (sampY) based on the maximum change across the pixel in s and t texture coordinates along the y screen space coordinate.

15. The rasterizer system of claim 14, wherein sampX is defined as:

sampX=power_of_2_ceil(LENGTH(LODSX, LODTX), where LODSX equals a ds/dx texture gradient, LODTX equals a dt/dx texture gradient, LENGTH represents a distance function which approximates the square root of the quantity $[(LODSX)^2 +(LODTX)^2]$, and power-of-2-ceil represents a rounding function which rounds to the next nearest power of two; and sampY is defined as:

sampY=power_of_2_ceil(LENGTH(LODSY, LODTY), where LODSY equals a ds/dy texture gradient, LODTY equals a dt/dy texture gradient, LENGTH represents a distance function which approximates the square root of the quantity $[(LODSY)^2 +(LODTY)^2]$, and power-of-2-ceil represents a rounding function which rounds to the next nearest power of two.

16. The rasterizer system of claim 14, wherein said screen space sampling rate determining means comprises:

means for calculating a footprint area $A_F$ based on a set of texture gradients ds/dx, dt/dy, ds/dy, and dt/dx where $A_F$=ABS (ds/dx*dt/dy−ds/dy*dt/dx), ABS denotes an absolute value function;

means for modifying $A_F$ when the pixel footprint area collapses to approximate a line, said modifying step consisting of setting $A_F$ to equal the maximum of ABS (ds/dx*dt/dy−ds/dy*dt/dx) and SampX+SampY; and means for calculating a final vertical screen space sampling rate (sampY) based on the ratio of $A_F$, as determined by said modifying means, and SampX.

17. The rasterizer system of claim 16, wherein said final vertical screen space sampling rate, SampY, is defined as:

sampY=power_of_2_ceil ($A_F$/SampX) where power_of_2_ceil represents a rounding function which rounds to the next nearest power of two.

18. The rasterizer system of claim 13, wherein said screen space sampling rate determining means comprises:

means for calculating a footprint area $A_F$ based on a set of texture gradients ds/dx, dt/dy, ds/dy, and dt/dx where $A_F$=ABS (ds/dx*dt/dy−ds/dy*dt/dx), ABS denotes an absolute value function;

means for determining a first horizontal screen space sampling rate (sampX) based on the maximum change across the pixel in s and t texture coordinates along the x screen space coordinate; and means for determining a first vertical screen space sampling rate (sampY) based on the ratio of $A_F$ and SampX.

19. The rasterizer system of claim 18, wherein sampX is defined as:

sampX=power_of_2_ceil(LENGTH(LODSX, LODTX), where LODSX equals ds/dx, LODTX equals dt/dx, LENGTH represents a distance function which approximates the square root of the quantity $[(LODSX)^2 +(LODTX)^2]$, and power_of_2_ceil represents a rounding function which rounds to the next nearest power of two; and sampY is defined as:

sampY=power_of_2_ceil ($A_F$/SampX) where power_of_2_ceil represents a rounding function which rounds to the next nearest power of two.

20. The rasterizer system of claim 13, wherein said texture data comprises at least one of two-dimensional texture data and three-dimensional texture data.

21. The rasterizer system of claim 13, wherein said multi-resolutional data comprises an image pyramid of reduced resolution images progressively filtered by a power of two.

22. A computer-implemented texture processing method for mapping texture data corresponding to a texture pattern comprising the steps of:

(a) determining a destination sample position in screen space for a pixel;

(b) determining texture coordinates in texture space corresponding to said destination sample position;

(c) calculating local rates of change of said texture coordinates corresponding to said destination sample position;

(d) independently scaling said local rates of change for each texture coordinate calculated in step (c); and (e) calculating a level-of-detail for texture data to be mapped from a pixel footprint in texture space to cover a pixel at said destination sample position in screen space pixel, said level-of-detail being calculated based on said independently scaled local rates of change in texture coordinates; whereby, an anisotropic texture level-of-detail compensation is provided which allows independent control of the effect of each texture coordinate on the level-of-detail of texture data chosen to be mapped to a pixel;

wherein said texture space comprises horizontal and vertical texture dimensions corresponding to horizontal and vertical texture coordinates (s,t), said texture pattern being provided as a video image, and wherein said scaling step (d) scales local rates of change along each texture coordinate by different amounts to compensate for oversampling in said video image.

23. The method of claim 22, wherein said scaling step (d) further comprises multiplying said local rate of change of at least one texture coordinate by a corresponding, predetermined scaling factor approximately equal to twice the Nyquist frequency limit for said video image divided by an actual sampling rate of said video image.

* * * * *